United States Patent
Li et al.

(10) Patent No.: US 8,335,042 B2
(45) Date of Patent: Dec. 18, 2012

(54) OPTICAL-DEFLECTION ACCELERATING DEVICE

(75) Inventors: Jingzhen Li, Shenzhen (CN); Qingyeng Wu, Shenzhen (CN)

(73) Assignee: Shenzhen University, Shenzhen, Guangdong (CN)

( * ) Notice: Subject to any disclaimer, the term of this patent is extended or adjusted under 35 U.S.C. 154(b) by 26 days.

(21) Appl. No.: 12/650,432

(22) Filed: Dec. 30, 2009

(65) Prior Publication Data
US 2010/0182706 A1 Jul. 22, 2010

(30) Foreign Application Priority Data
Jan. 19, 2009 (CN) .......................... 2009 1 0104978

(51) Int. Cl.
G02B 17/00 (2006.01)
G02B 17/08 (2006.01)
G02B 3/06 (2006.01)
(52) U.S. Cl. ........................................ 359/728; 359/710
(58) Field of Classification Search .................. 359/710, 359/711, 712, 727, 728; 356/327, 328
See application file for complete search history.

(56) References Cited

U.S. PATENT DOCUMENTS

| | | | | |
|---|---|---|---|---|
| 4,351,611 A | * | 9/1982 | Leif | 356/328 |
| 5,596,989 A | * | 1/1997 | Morita | 600/437 |
| 6,330,115 B1 | * | 12/2001 | Hermanns | 359/643 |
| 7,456,956 B2 | * | 11/2008 | Jiang et al. | 356/327 |

* cited by examiner

Primary Examiner — Alicia M Harrington
(74) Attorney, Agent, or Firm — Global IP Services; Tianhua Gu

(57) ABSTRACT

An optical-deflection accelerating device is provided. The device comprises an incident light source for generating an incident light-beam with a deflection speed, an emergent-light capturing device for capturing an emergent light-beam, and a reflective device which is a curved-surface reflective mirror for reflecting the incident light-beam to the emergent-light capturing device. When the incident light-beam enters to a reflective point on the curved-surface reflective mirror in sequence, an incident angle and a reflective angle are altered with locations of the reflective point on the curved-surface reflective mirror, and are increased with an increased curvature of the reflective point. When the incident light-beam is deflected with a tiny initial deflection angle, the reflective light-beam is deflected therewith and the deflection angle is enlarged. The curvature of the curved-surface reflective mirror can be adjusted to obtain different accelerated deflections.

17 Claims, 2 Drawing Sheets

OPTICAL-DEFLECTION ACCELERATING DEVICE

This application claims priority to Chinese Patent Application No. 200910104978.1, filed on Jan. 19, 2009, which is hereby incorporated by reference.

BACKGROUND

1. Field of the Invention

The present invention relates to ultra-high speed photography technology, and more particularly to an optical-deflection accelerating device in ultra-high speed photography technology.

2. Description of the Related Technology

To obtain spatio-temporal information in microsecond to nanosecond transient-varying processes, for example, information for researching detonation physical process and shock-wave physical process, ultra-high speed photography technology has been developed. The ultra-high speed photography technology can be used to obtain photos of a transient-process in a microsecond-to-nanosecond time interval for studying variation rules of the transient process. The key technology of the ultra-high speed photography technology is how to generate a high speed and how to frame. That is, the key technology is how to obtain dozens to hundreds of photos which are varied over time in an ultra-short period.

Conventional ultra-high speed photographic methods first capture images, make light-beams of the images irradiate to a rotating mirror which rotates at a high speed, and then form high-speed deflections of emergent light-beams through the rotating mirror at the high speed, thus to high-speedily deflect the incident light-beams and perform a framing operation. A speed of deflecting the incident light-beams is a major issue related to performance of photography using the rotating mirror. Therefore, one of well studied subjects in the field involves speed improvement of deflecting the incident light-beams.

Currently, there are two methods for improving the speed of deflecting the light-beams. One method is making the incident light-beams irradiate to the rotating mirror which high speedily rotates, and improving the rotating speed of the rotating mirror to accelerate the deflection speed of the emergent light-beams. Another method is accelerating the deflection speed of the emergent light-beams through multiple reflections of the incident light-beams. In the method of improving the rotating speed of the rotating mirror, several ways, including using a high density material to be applied to the rotating mirror, improving a cross-sectional shape of the rotating mirror, improving a process technology in processing the rotating mirror, and improving a lateral structure of the rotating mirror, etc., can be used to accelerate the rotating speed of the rotating mirror. But this method is difficult to achieve multiplied acceleration of the rotating speed of the rotating mirror (HIGH POWER LASER AND PARTICLE BEAMS, 2006, 18(6):1277~1281; SPIE, 2005, Vol. 5638: 117~123). The method of multi-reflection can multiply the deflection speed of the emergent light-beams.

Currently, the method of multi-reflection to accelerate the deflection speed of the emergent light-beams, can be performed by two schemes. One scheme is combining a rotating polyhedral reflective mirror with a static reflective mirror, and reflecting the light-beams between the reflective mirrors to achieve an acceleration of 4 times, 8 times or 12 times of the deflection speed of the emergent light-beams. Now there is an application using a nonagonal rotating mirror with a tetrahedronal reflector to achieve 4 times acceleration of the deflection speed of the emergent light-beams. Another scheme is reflecting the light-beams with a wedge-gap shape retroreflector, which is a combination of a moving mirror and a static mirror, or a double mirror in opposite directions. The light-beams can be reflected to 16 times acceleration of the incident light-beams, as determined by the wedge-gap shape device and the incident angle of the incident light-beams. Now, there is an application that achieves 7 times acceleration (SPIE, 2003, Vol. 4948:330~335). The method of accelerating the emergent light-beams by multiple reflections must satisfy two conditions. One condition is that there must be an accurate rotating device, and another condition is that the light-beams must be multiple reflected by the reflective mirrors and the relative locations of the reflective mirrors must be accurate. However, the method of multi-reflection must be performed by accurate calculation, and the device thereof comes with a complex structure and a high cost.

BRIEF SUMMARY

The present invention relates to an optical-deflection accelerating device which can solve the problem of the conventional technology, and obtain any multiplier of deflecting acceleration of a light-beam.

An optical-deflection accelerating device in accordance with an exemplary embodiment of the present invention, comprises an incident light source configured for generating an incident light-beam with a deflection speed, an emergent-light capturing device configured for capturing an emergent light-beam, and a reflective device configured for reflecting the incident light-beam to the emergent-light capturing device. The reflective device is a curved-surface reflective mirror.

Preferably, please refer to FIG. 3, a part of the curved-surface reflective mirror 203, which the incident light-beam scans, is a cylindrical surface. A generatrix of the cylindrical surface is perpendicular to a flat surface P where the incident light-beam and the emergent light-beam are located.

Preferably, a curvature of the cylindrical surface of the curved-surface reflective mirror is unchangeable or continuously changeable along a deflection direction of the incident light-beam.

Preferably, the curvature of the cylindrical surface of the curved-surface reflective mirror satisfies a following equation:

$$m = 1 + 2\rho L$$

where m represents a multiplying factor of the deflection speed of the emergent light-beam over the deflection speed of the incident light-beam. $\rho$ represents the curvature of the curved-surface reflective mirror at a reflective point. L represents a distance between an original deflection point and a point where the cylindrical surface of the curved-surface reflective mirror is intersected by the incident light-beam that is not deflected.

Preferably, the curved-surface reflective mirror comprises a plurality of cylindrical surfaces.

Preferably, the curvature of the cylindrical surface of the curved-surface reflective mirror is a constant value, or a variable value continuously increased along the deflection direction of the incident light-beam.

Preferably, the cylindrical surface of the curved-surface reflective mirror is a cylinder surface or a transcendental curved-line cylindrical surface.

Preferably, an incident focus lens is disposed between the incident light source and the curved-surface reflective mirror to make the incident light-beam generated by the incident light source form a focal line on the curved-surface reflective mirror.

Preferably, an emergent focus lens is disposed between the curved-surface reflective mirror and the emergent-light capturing device to restore the emergent light-beam.

The optical-deflection accelerating device of the present invention has many advantages described as follows. Since the reflective device of the optical-deflection accelerating device is a curved-surface reflective mirror, when the incident light-beam enters into a certain point of the curved-surface reflective mirror, an incident angle of the incident light-beam is equal to a reflective angle of the emergent light-beam based on the law of reflection, and the incident angle and the reflective angle are increased along with variation of the location of the reflective point on the curved-surface reflective mirror or an increasing curvature. When the incident light-beam is deflected, the emergent light-beam is also deflected therewith and the deflection angle is enlarged. Thus, the present invention can adjust the curvature of the curved-surface reflective mirror, as needed, to obtain different multiplying factors for accelerating deflection. It is a novel method different from the general two methods of the conventional technology for improving the deflection-accelerating multiplying factor of the light-beam, which are employing the rotating mirror to reflect and improving the rotating speed of the rotating mirror; or accurately locating the two opposite reflective mirrors and increasing the reflecting amount therebetween to improve the deflection-accelerating multiplying factor of the light-beam. Furthermore, the optical-deflection accelerating device is very suitable for a tiny angle of the electrical-optical deflection and a tiny displacement generated by the Goos-Hänchen displacement to accelerate deflection of the light-beam. The process of accelerating deflection of the light-beam is generally in a nanosecond magnitude, and time of the transient process is a relaxation time of the electro-optical effect.

Since the optical-deflection accelerating device of the present invention does not require any mechanical rotating device or reflective mirrors that are accurately located in order to conduct multiple reflections, it has a simple structure. The present invention alters the curvature of the curved-surface reflective mirror to obtain 10 times or more than 10 times of optical-deflection acceleration to improve the deflection speed of the emergent light-beam. Thus the deflection speed of the light-beam can be improved 1~2 orders of magnitude, thus greatly improving scan speed of the light-beam deflection device, photographic frequency, amount of the spatiotemporal information, and satisfying needs of researching the transient process, such as detonation process or shock-wave process, etc., and particularly satisfying the needs of scientific research in extreme condition, such as top-speed laser fly die or Z-pinch, etc.

Furthermore, the portion of the curved-surface reflective mirror on which the incident light-beam scanned, is the cylindrical surface. The generatrix of the cylindrical surface is perpendicular to the flat surface where the incident light-beam and the emergent light-beam are located, such that the incident light-beam which is not deflected, is perpendicular to the generatrix of the cylindrical surface. Thus it is fitting to design the curvature of the cylindrical surface according to a predetermined acceleration multiplying factor.

Furthermore, the distance between the original deflection point and the point where the curved-surface reflective mirror is intersected by the incident light-beam that is not deflected may be adjusted to adjust the optical-deflection acceleration multiplying factor. A moveable device is used for moving the incident light source or the curved-surface reflective mirror to change the distance therebetween and an accelerated speed thereof may be changed gradually. The more the speed is accelerated, the larger the optical-deflection acceleration multiplying factor becomes.

Furthermore, the curved-surface reflective mirror comprises two or more cylindrical surfaces to discontinuously change the optical-deflection acceleration multiplying factor in a continuous high-speed photography process. Alternatively, the curvature of the cylindrical surface may be increased or decreased continuously to continuously change the optical-deflection acceleration multiplying factor.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe exemplary embodiments of the present optical-deflection accelerating device in detail. The following description is given by way of example, and not limitation.

In the present invention, light-beams with tiny deflections or displacements are sequentially projected into different locations of a spatial curved surface for forming different incident angles. Based upon the reflection law, reflective angles of emergent light-beams and incident angles of incident light-beams are equal and continuously change. Degrees of the reflective angles and a change range of the reflective angles are limited by relative locations of the incident light-beams and the curved surface, and a curvature of the curved surface. Thus, they may be adjusted in design. Therefore, the invention achieves scanning of the emergent light-beams and enlarging in deflection angles. An acceleration multiplying factor is related to structural parameters, such as a relative location of a system configured for generating the original tiny deflections and displacements, and the curvatures of the curved surface.

Figure 1:
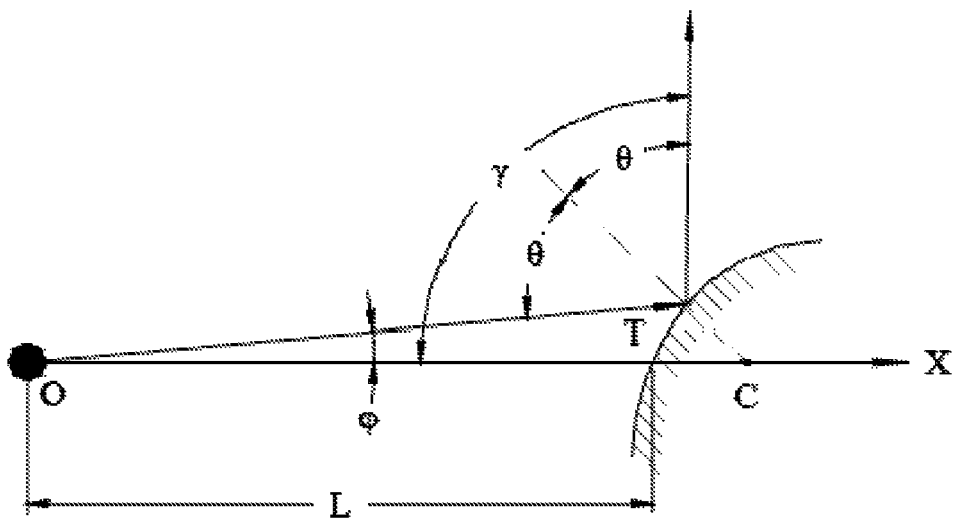
FIG. 1 is a schematic principle view of an optical-deflection accelerating device of the present invention.

Referring to FIG. 1, an optical-deflection accelerating device of the present invention is provided. In the optical-deflection accelerating device of the present invention, an incident light-beam has an original tiny deflection angle $\phi$, and enters to a cylindrical-surface reflective mirror which has a radius r, a curvature $\rho$ ($\rho=1/r$), and a center C. An incident angle at an incident point T is $\theta$, thus a deflection angle of an emergent light-beam related to an incident optical axis is $\gamma=2\theta+\phi$. When the original deflection angle $\phi$ is tiny (generally less than) 1°), an optical-deflection acceleration multiplying factor is $$m = \frac{d\gamma}{d\varphi} = 2\left(1 + \frac{L}{r}\right) = 1 + 2\rho L,$$

wherein L is a distance between an original deflection point and a vertex of the cylindrical-surface reflective mirror. It will be seen from this that, the optical-deflection acceleration multiplying factor is determined by ρ and L. When ρ and L are larger, that is, the curvature of the curved-surface reflective mirror is increased and the distance between the original deflection point and the vertex of the reflective mirror is increased, the optical-deflection acceleration multiply factor is increased. In principle, the optical-deflection acceleration multiplying factor can be increased indefinitely. However, when ρ is increased, the radius of the curved-surface reflective mirror will be decreased, thus making it difficult to process the reflective mirror. When the light-beam is deflected to scan the curved-surface reflective mirror, the curved-surface reflective mirror must have enough scan surface, thus limiting the curvature of the curved-surface reflective mirror from being too large. On the other hand, when the distance between the original deflection point and the vertex of the cylindrical-surface reflective mirror is increased, the incident light-beam will generate a large diffusion, which influences intensity of the emergent light-beam and accordingly downgrades the quality of the final image, thus limiting L from being increased indefinitely. Generally, L/r may be in a range of 10~100, thus the light-beam deflection angle is amplified and the deflection acceleration multiplying factor can be improved 1~2 orders of magnitude, thus solving the issue of improving the optical-deflection acceleration multiplying factor as compared to conventional technology. In addition, the optical-deflection accelerating device does not include any mechanical rotating device, such as, the rotating mirror, thus it is simple and is suitable for cooperating with electro-optical deflection and Goos-Hänchen displacement to accelerate deflection of the light-beam with original deflection and original displacement. Since the present invention employs optical reflection law, the present invention falls within an optical-deflection accelerating technology field, and is an accelerating technology which employs a spatial curved surface for reflection.

Figure 2:
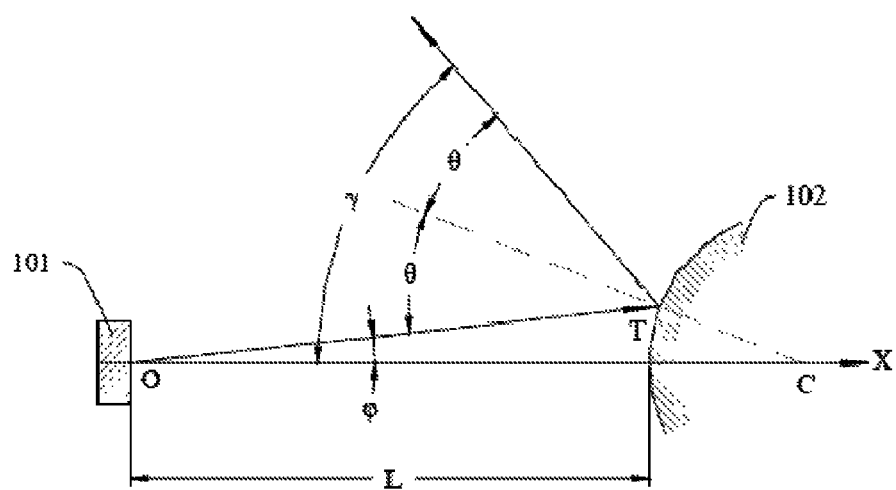
FIG. 2 is a schematic structure view of an optical-deflection accelerating device in accordance with a first exemplary embodiment of the present invention.

FIG. 2 shows an optical-deflection accelerating device in accordance with a first exemplary embodiment of the present invention. The optical-deflection accelerating device includes an incident light source, a curved-surface reflective mirror and an emergent-light capturing device (not shown). The incident light source employs an electrical-optical deflection crystal (EOC) 101 to generate deflection. The EOC 101 may be a MgO-doped LiNbO$_3$ crystal. The curved-surface reflective mirror 102 is a cylindrical-surface reflective mirror (CCR) having a radius thereof r and a curvature thereof ρ. An optical axis OX passes through a center C of the cylindrical surface. A distance between the EOC and the cylindrical-surface reflective mirror in the optical axis OX is L, which is a distance between an original deflection point and a vertex of the cylindrical-surface reflective mirror. When a high-voltage pulse is applied to the EOC 101, it makes the light-beam with an initial deflection angle Φ in a transient time (nanosecond) of a front edge of the pulse, and makes the light-beam with a certain deflection speed. When the incident light-beam scans on the cylindrical-surface reflective mirror 102, with the change of the incident angle θ, the reflective angle θ of the emergent light-beam thereof increases gradually, thus achieving enlargement of the deflection angle. Since the radius of the cylindrical-surface reflective mirror does not change, and the center passes through the optical axis OX, that is, the center is located at an incident path of the incident light-beam before being deflected, and since the distance L between the original deflection point and the cylindrical-surface reflective mirror 102 does not change, the acceleration m of the light-beam deflection speed does not change according to the equation $$m = \frac{d\gamma}{d\varphi} = 2\left(1 + \frac{L}{r}\right) = 1 + 2\rho L.$$

A curved-surface reflective mirror and a distance between the EOC and the curved-surface reflective mirror can be designed according to the needed multiplying factor of the light-beam deflection.

Furthermore, the EOC 101 may be disposed on a moving device which is movable along the optical axis OX while the curved-surface reflective mirror 102 is fixed. Thus when the EOC 101 moves along the optical axis OX with the moving device, L will change to vary the multiplying factor m of deflection speed of the light-beam. Therefore, in the present invention, the distance between the EOC 101 and the curved-surface reflective mirror 102 can be adjusted to change the multiplying factor m of the deflection speed of the light-beam.

The curved-surface reflective mirror 102 may be composed of a plurality of cylindrical surfaces with different curvatures. Thus, in the present invention, different initial deflection angles φ of the incident light-beam can be selected to make the incident light-beam irradiate to different cylindrical surfaces with different curvatures. Therefore, a different multiplying factor m of the light-beam deflection speed can be achieved based on the incident light-beam.

In addition, the curved-surface reflective mirror 102 also may be a cylindrical surface of another type. To make the whole device more compact, the curved-surface reflective mirror 102 may be designed to be a transcendental curved-line cylindrical surface. The curvature ρ of the transcendental curved-line cylindrical surface is gradually reduced along a direction of reflection of the incident light-beam, and the curvature center C of the transcendental curved-line cylindrical surface changes along the optical axis OX. Thus the distance between the EOC 101 and the curved-surface reflective mirror 102 are fixed, that is L does not change, thus reducing a number of moving components in the present invention to make the whole device more compact. In the present invention, the EOC 101 can be used to control the initial deflection angle φ of the incident light-beam. That is, different curvatures of irradiating the incident light-beam to the transcendental curved-line cylindrical surface are selectable to obtain different multiplying factors of the deflection speed of the light-beam.

Figure 3:
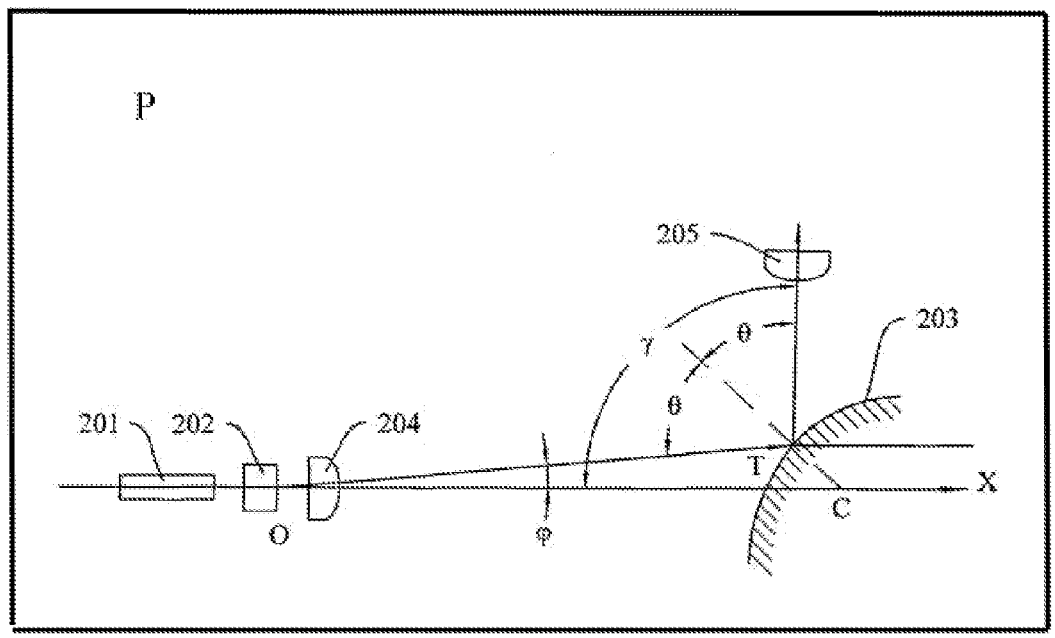
FIG. 3 is a schematic structure view of an optical-deflection accelerating device in accordance with a second exemplary embodiment of the present invention.

FIG. 3 shows an optical-deflection accelerating device in accordance with a second exemplary embodiment of the present invention. The optical-deflection accelerating device includes a Q-switched pulse laser 201 used as the incident light source, an electrical-optical deflection crystal (EOC) 202, a curved-surface reflective mirror 203, an emergent-light capturing device (not shown), an incident focus lens 204 and an emergent focus lens 205. The Q-switched pulse laser 201 may be a ruby laser or a YAG laser. The incident focus lens 204 is disposed between the EOC 202 and the curved-surface reflective mirror 203, and the emergent focus lens 205 is disposed between the curved-surface reflective mirror 203 and the emergent-light capturing device. The curved-surface reflective mirror 203 may be those described in the above exemplary embodiment. The incident focus lens 204 is configured to form a focal line of the incident light-beam on the curved-surface reflective mirror 203 to improve reflective accuracy of the reflective light-beam. The emergent focus lens 205 is configured to restore the emergent light-beam to needed light-beam, to avoid problem of downgrading final image quality because of generated diffusion of the emergent light-beam.

The above description is given by way of example, not limitation. Given the above disclosure, one skilled in the art can devise variations that are within the scope and spirit of the invention disclosed herein, including configurations of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An optical-deflection accelerating device, comprising: an incident light source configured for generating an incident light-beam with a deflection speed; an emergent-light capturing device configured for capturing an emergent light-beam; and a reflective device configured for reflecting the incident light-beam to the emergent-light capturing device; wherein the reflective device is a curved-surface reflective mirror, a part of the curved-surface reflective mirror scanned by the incident light-beam comprises a cylindrical surface, and wherein a generatrix of the cylindrical surface is perpendicular to a flat surface where the incident light-beam and the emergent light-beam are located.

2. The optical-deflection accelerating device as claimed in claim 1, wherein a curvature of the cylindrical surface of the curved-surface reflective mirror is unchangeable or changeable along a deflection direction of the incident light-beam.

3. The optical-deflection accelerating device as claimed in claim 2, wherein the curvature of the cylindrical surface of the curved-surface reflective mirror satisfies the following equation:

$$m = 1 + 2\rho L,$$

where:
m represents a multiplying factor as a ratio of the deflection speed of the emergent light-beam over the deflection speed of the incident light-beam;
$\rho$ represents the curvature of the curved-surface reflective mirror at a reflective point; and
L represents a distance between an original deflection point and a point where the cylindrical surface of the curved-surface reflective mirror is intersected by the incident light-beam that is not deflected.

4. The optical-deflection accelerating device as claimed in claim 2, further comprising an incident focus lens disposed between the incident light source and curved-surface reflective mirror to make the incident light-beam generated by the incident light source from a focal line on the curved-surface reflective mirror.

5. The optical-deflection accelerating device as claimed in claim 2, further comprising an emergent focus lens disposed between the curved-surface reflective mirror and the emergent-light capturing device to restore the emergent light-beam.

6. The optical-deflection accelerating device as claimed in claim 3, wherein the curved-surface reflective mirror comprises a plurality of cylindrical surfaces.

7. The optical-deflection accelerating device as claimed in claim 3, further comprising an incident focus lens disposed between the incident light source and curved-surface reflective mirror to make the incident light-beam generated by the incident light source form a focal line on the curved-surface reflective mirror.

8. The optical-deflection accelerating device as claimed in claim 3, further comprising an emergent focus lens disposed between the curved-surface reflective mirror and the emergent-light capturing device to restore the emergent light-beam.

9. The optical-deflection accelerating device as claimed in claim 6, further comprising an incident focus lens disposed between the incident light source and curved-surface reflective mirror to make the incident light-beam generated by the incident light source form a focal line on the curved-surface reflective mirror.

10. The optical-deflection accelerating device as claimed in claim 6, further comprising an emergent focus lens disposed between the curved-surface reflective mirror and the emergent-light capturing device to restore the emergent light-beam.

11. The optical-deflection accelerating device as claimed in claim 1, wherein the curvature of the cylindrical surface of the curved-surface reflective mirror is a constant value or a variable value continuously increased along a deflection direction of the incident light-beam.

12. The optical-deflection accelerating device as claimed in claim 11, wherein the cylindrical surface of the curved-surface reflective mirror is a cylinder surface or a transcendental curved-line cylindrical surface.

13. The optical-deflection accelerating device as claimed in claim 12, further comprising an incident focus lens disposed between the incident light source and curved-surface reflective mirror to make the incident light-beam generated by the incident light source form a focal line on the curved-surface reflective mirror.

14. The optical-deflection accelerating device as claimed in claim 11, further comprising an incident focus lens disposed between the incident light source and curved-surface reflective mirror to make the incident light-beam generated by the incident light source form a focal line on the curved-surface reflective mirror.

15. The optical-deflection accelerating device as claimed in claim 11, further comprising an emergent focus lens disposed between the curved-surface reflective mirror and the emergent-light capturing device to restore the emergent light-beam.

16. The optical-deflection accelerating device as claimed in claim 1, further comprising an incident focus lens disposed between the incident light source and the curved-surface reflective mirror to make the incident light-beam generated by the incident light source form a focal line on the curved-surface reflective mirror.

17. The optical-deflection accelerating device as claimed in claim 1, further comprising an emergent focus lens disposed between the curved-surface reflective mirror and the emergent-light capturing device to restore the emergent light-beam.

* * * * *